UNITED STATES PATENT OFFICE.

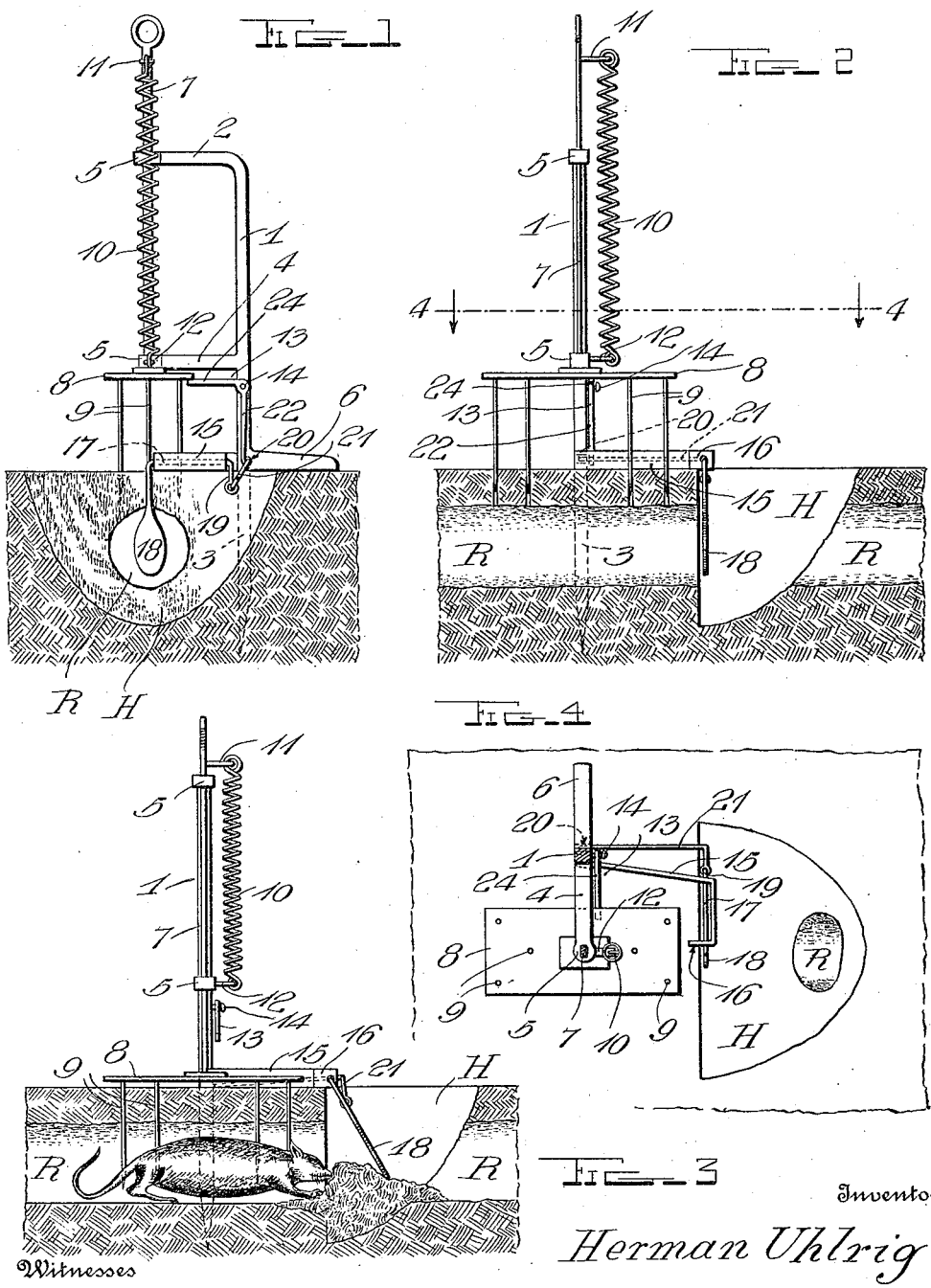

HERMAN UHLRIG, OF WAMEGO, KANSAS.

GOPHER-TRAP.

1,132,697.  Specification of Letters Patent. Patented Mar. 23, 1915.

Application filed December 15, 1913. Serial No. 806,830.

*To all whom it may concern:*

Be it known that I, HERMAN UHLRIG, a citizen of the United States, residing at Wamego, in the county of Pottawatomie and State of Kansas, have invented certain new and useful Improvements in Gopher-Traps; and I do declare the following to be a full, clear, and exact description of the invention, such as will enable others skilled in the art to which it appertains to make and use the same.

This invention relates to improvements in traps and more particularly to those adapted for use in trapping gophers.

The primary object of the invention is to provide a trap of this character so constructed that in order to set the same, a hole must be dug in the ground communicating with the gopher's runway. It is a well known fact that if the gopher sees any rays of light coming into his runway or burrow, he will immediately endeavor to close the opening through which the light is admitted and for this reason it has been found desirable to set the trap in the above mentioned manner with its trigger so located that the gopher in trying to stop the flow of light into this runway, will push earth against said trigger and will trip the same thus allowing a pronged plunger to descend upon him.

A secondary object is to provide a simply constructed trap of this character in which comparatively few moving parts are employed.

With the above mentioned objects in view, the invention resides in certain novel features of construction and combination herein described and claimed and shown in the drawings wherein:

Figure 1 is a side elevation of my improved gopher trap showing the same in operative position; Fig. 2 is a front view thereof; Fig. 3 is a similar view showing the trigger tripped and the trap sprung; and Fig. 4 is a horizontal sectional view on the line 4—4 of Fig. 2.

In the accompanying drawings, I have shown a standard 1 having its upper end bent laterally to form an arm 2 and its lower end pointed to provide an anchoring stake 3 adapted for insertion into the ground. The standard 1 is also provided with a second arm 4 disposed beneath the arm 2 and said arms 2 and 4 carry guides 5 on their outer ends. I also preferably provide a finger 6 on the standard 1 to be engaged by the foot of the operator in forcing the stake 3 into the ground and to limit its insertion therein.

A vertical plunger rod 7 is slidably mounted within the guides 5 and said plunger rod is provided on its lower end with a plate 8 which carries a plurality of depending prongs 9. A coiled spring 10 is connected to an arm 11 on the rod 7 and a similar arm 12 carried by the lower guide 5, a catch, here shown as a bell crank lever 13, pivoted at 14, being adapted to hold the plate 8 and its coacting parts in a raised position against the tension of the spring 10 in a manner to be described.

A bracket 15 projects from one side of the stake 3 and may be formed integrally therewith or secured thereto in any suitable manner. This bracket is formed of a single strip of flat metal bent into the form of an L and having its free terminal bent inwardly to form a bearing lug 16. As shown, one arm of the bracket 15 projects laterally from the stake 3 at right angles to the finger 6, and the other or second arm of said bracket projects laterally from the free end of the first-named arm at substantially right angles thereto and extends in the opposite direction from the finger 3. The free end of said second arm is bent into parallel relation to said first-named arm to form the lug 16, which lug and said first-named arm, are provided with the alined opening in which the rock shaft 17 is mounted. Through this lug 16 and the shank of the L-shaped bracket is journaled a rock shaft 17 having a depending trigger 18 at one end and a depending crank arm 19 at its opposite end. Pivoted to the crank arm 19 and extending inwardly and seated within an aperture 20 in said standard, is a link 21 which, as clearly shown in Fig. 1, acts as a stop for the lower end 22 of the bell crank lever 13 when the upper arm 24 thereof is disposed beneath the plate 8 when the same is raised. The raising of the plate 8 and its coacting parts, will expand the spring 10 and the same will be maintained in its expanded position and the plate 8 will remain in a raised position until the trigger 18 is tripped.

It will be seen by reference to the drawing that in order to set the trap, a hole H must be dug into the ground into communication with the runway R of the gopher. The stake 3 of the standard 1 may then be forced into the ground with its L-shaped bracket extending slightly over the hole H and in such a position that the prongs 9 will be disposed directly above the runway R. The plunger rod 7 may now be worked up and down in order to force the prongs 9 through the soil and thus form openings through which they may travel when the trap is sprung by the gopher. The plunger rod 7 is now raised, this operation raising the plate 8, and the arm 24 of the bell crank lever 13 is swung beneath said plate 8. The link 21 is now placed in position outside of the lower end 22 of the bell crank lever and its free end is inserted within the aperture 20 in the standard 1. When in this position, the trigger 18 will lie directly in alinement with the runway R. If now, a gopher should spy the rays of light coming into his runway, he would immediately endeavor to close the opening through which the light was admitted. In so doing, he would force dirt against the trigger 18 which would rock the shaft 17, and retract the arm 21, whereupon the spring 10 would exert a downward pull on the plunger rod 7 thus rocking the bell crank lever 13 to one side and allowing the plate 8 and the prongs 9 to descend. It will be clearly understood that these prongs will then deeply penetrate into the gopher's body and render his escape impossible.

Although I have described my invention with considerable minuteness as to details, I do not wish to be unduly limited to details other than those amplified in the appended claim. As illustrative of this, it will be obvious that I need not provide the aperture 20 in the standard 1 but could, to equal advantage, employ a stop or shoulder at this point.

Having thus described my invention, what I claim as new is:

The combination with an upright stake to be forced into the earth, said stake having a horizontally projecting finger to limit its insertion into the earth, a spring lowered plunger, a catch to retain the plunger in raised position, and a rock shaft to release said catch, of a horizontal arm secured to the prong and projecting laterally therefrom at right-angles to said finger, and a second horizontal arm projecting laterally from the free end of the first named arm at substantially right-angles thereto, said second arm extending in the opposite direction from the finger, the free end of the second arm being bent into parallel relation with the first named arm, and the latter and said bent end having alined openings in which the rock shaft is mounted, the finger and the two arms lying in the same horizontal plane.

In testimony whereof I have hereunto set my hand in presence of two subscribing witnesses.

HERMAN UHLRIG.

Witnesses:
W. C. BETTMANN,
AUGUST UHLRIG.

Copies of this patent may be obtained for five cents each, by addressing the "Commissioner of Patents, Washington, D. C."